United States Patent
Ge et al.

(10) Patent No.: US 10,688,660 B2
(45) Date of Patent: Jun. 23, 2020

(54) METHOD AND APPARATUS OF SCHEDULING WELDING OPERATIONS FOR A WELDING ROBOT

(71) Applicant: ABB Schweiz AG, Baden (CH)

(72) Inventors: Jingguo Ge, Shanghai (CN); Lei Mao, Shanghai (CN); Peng Kong, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/838,732

(22) Filed: Dec. 12, 2017

(65) Prior Publication Data

US 2018/0111267 A1    Apr. 26, 2018

Related U.S. Application Data

(63) Continuation of application No. PCT/CN2015/084933, filed on Jul. 23, 2015.

(51) Int. Cl.
*B25J 9/16* (2006.01)

(52) U.S. Cl.
CPC .......... *B25J 9/1661* (2013.01); *B25J 9/1664* (2013.01); *B25J 9/1666* (2013.01); *B25J 9/1669* (2013.01);
(Continued)

(58) Field of Classification Search
CPC .......... G05B 19/41865; G05B 19/4183; G05B 2219/32258; G05B 2219/40476;
(Continued)

(56) References Cited

U.S. PATENT DOCUMENTS

| | | | | |
|---|---|---|---|---|
| 4,998,005 A | * | 3/1991 | Rathi | B23K 26/032 219/121.62 |
| 2002/0128790 A1 | * | 9/2002 | Woodmansee | B23P 6/002 702/81 |

(Continued)

FOREIGN PATENT DOCUMENTS

| | | |
|---|---|---|
| CN | 104526117 A | 4/2015 |
| CN | 104750023 A | 7/2015 |
| JP | 2010269336 A | 12/2010 |

OTHER PUBLICATIONS

Joseph Polden et al., "Offline programming for a complex welding system using DELMIA automation, (2011), University of Wollongong, pp. 1-6." (Year: 2011).*

(Continued)

*Primary Examiner* — Chun Cao
(74) *Attorney, Agent, or Firm* — Taft Stettinius & Hollister LLP; J. Bruce Schelkopf

(57) ABSTRACT

Embodiments of the present disclosure relate to a method and apparatus of scheduling welding operations. In an embodiment of the present disclosure, the method includes identifying seams on a welding object in a three-dimensional model for the welding object based on geometry of bodies contained in the welding object. The method also includes determining a welding sequence based on the seams, welding parameters and welding process requirements. The method further includes generating an operation procedure for a welding robot based on another three-dimensional model for the welding robot, the welding sequence, robot path parameters and the welding parameters to schedule the welding operations of the welding object. With embodiments of the present disclosure, the welding procedure could be generated in an automatic way and thus a robot can be used in welding huge and complex structures or structures manufactured in a small batch so that the automatic level can (Continued)

be increased remarkably and the production cost can be reduced accordingly.

16 Claims, 8 Drawing Sheets

(52) U.S. Cl.
CPC ... *B25J 9/1671* (2013.01); *G05B 2219/40476* (2013.01); *G05B 2219/40518* (2013.01); *G05B 2219/45104* (2013.01); *G05B 2219/49386* (2013.01)

(58) Field of Classification Search
CPC .......... G05B 2219/40518; G05B 2219/45104; G05B 2219/49386; B23K 9/0953; B23K 9/0956; B23K 9/1043; B23K 9/173; B25J 9/1661; B25J 9/1666; B25J 9/1669; B25J 9/1671; B25J 9/1664
See application file for complete search history.

(56) References Cited

U.S. PATENT DOCUMENTS

| | | | |
|---|---|---|---|
| 2010/0122973 A1 | 5/2010 | Sassatelli et al. | |
| 2010/0152870 A1* | 6/2010 | Wanner | B23K 9/0256 700/97 |
| 2012/0029674 A1* | 2/2012 | Hida | B23K 9/127 700/98 |
| 2013/0282182 A1 | 10/2013 | Hideg | |
| 2014/0042135 A1 | 2/2014 | Daniel et al. | |
| 2016/0361774 A9* | 12/2016 | Daniel | B23K 9/0953 |

OTHER PUBLICATIONS

State Intellectual Property Office of the P.R. China, International Search Report & Written Opinion issued in corresponding Application No. PCT/CN2015/084933, dated Apr. 28, 2016, 11 pp.
Extended European Search Report, European Patent Application No. 15898673.7, dated Apr. 18, 2019, 9 pages.
Rubinovitz, J. et al., Task Level Off-Line Programming System for Robotic Arc Welding—an Overview, Journal of Manufacturing Systems, Society of Manufacturing Engineers, vol. 7, No. 4, Jan. 1, 1988, pp. 293-305.
Kevin Micallefgu Fangmitchell Dinham, Automatic Seam Detection and Path Planning in Robotic Welding, Robotic Welding, Intelligence and Automation, Jan. 1, 2011, pp. 23-32, retrieved from https://link.springer.com/chapter/10.1007/972-3-643-19959-2_3.
The State Intellectual Property Office of the People'S Republic of China, First Office Action Issued in corresponding Chinese application No. 2015800815397 dated Mar. 27, 2020, 16 pp.
The State Intellectual Property Office of the People'S Republic of China, Search Report issued in corresponding Chinese application No. 2015800815397 dated Mar. 19, 2020, 6 pp.
Yao Yan, "Construction and Quality Control of Steel Structure Project of Suzhou International Expo Center, Building construction, vol. 2, Issue 6, Jun. 20, 2005", 11 pp.

* cited by examiner

Overlapping relationship of 2 straight line segments

| | | s | Explanation | Illustration | Relationship | Action to line 1 | Output |
|---|---|---|---|---|---|---|---|
| 1 | | 0 | !Co-plane | | Separated | Keep | Itself |
| 2 | Co-Plane, Not Co-line | 0 | Co-plane but separated | | Separated | Keep | Itself |
| 3 | | | Usually not exist in CAD model | | Crossed | Keep | Itself |
| 4 | | 1 | h1/ t1/ h2/ t2 | | ConnectedNot Coline | Keep | Itself |
| 5 | | 2 | h1&h2/h1&t2/t1&h2/t1&t2 | | ConnectedNot Coline | Keep | Itself |
| 6 | Co-Line | 0 | | | Separated | Keep | Itself |
| 7 | | | (h1,h2), coincide | | Connected CoLine | Keep | Itself |
| 8 | | | (h1,t2), coincide | | Connected CoLine | Keep | Itself |
| 9 | | | (t1,h2), coincide | | Connected CoLine | Keep | Itself |
| 10 | | | (t1,t2), coincide | | Connected CoLine | Keep | Itself |
| 11 | | | (h1,h2), not coincide | | OverlapHead | Remove head | Tail (h2->t1) |
| 12 | | | (h1,t2), not coincide | | OverlapHead | Remove head | Tail (t2->t1) |
| 13 | | 2 | (t1,h2), not coincide | | OverlapTail | Remove tail | Head (h1->h2) |
| 14 | | | (t1,t2), not coincide | | OverlapTail | Remove tail | Head (h1->t2) |
| 15 | | | (h2,t2), not coincide — h1 closer to h2 than to t2 | | OverlapMiddle | Remove middle | Head (h1->h2) Tail (t2->t1) |
| 16 | | | (h2,t2), not coincide — h1 closer to t2 than to h2 | | OverlapMiddle | Remove middle | Head (h1->t2) Tail (h2->t1) |
| 17 | | | (h1,t1), not coincide | | OverlapAll | Remove all | Empty |

Fig. 11A

| | | | | | | | |
|---|---|---|---|---|---|---|---|
| 18 | | Line1 is longer | (h1,h2,t2) | →→ | OverlapHead | Remove head | Tail (t2->t1) |
| 19 | | | | ←→ | OverlapHead | Remove head | Tail (h2->t1) |
| 20 | | | (t1,h2,t2) | →→ | OverlapTail | Remove tail | Head (h1->h2) |
| 21 | 3 | | | →← | OVerlapTail | Remove tail | Head (h1->t2) |
| 22 | | Line1 is shorter | (h1,t1,h2) | →→ | OverlapAll | Remove all | Empty |
| 23 | | | | ←→ | OverlapAll | Remove all | Empty |
| 24 | | | (h1,t1,t2) | ←→ | OverlapAll | Remove all | Empty |
| 25 | | | | →← | OverlapAll | Remove all | Empty |
| 26 | 4 | (h1,t1,h2,t2) | | →→ | OverlapAll_Equal | Remove all | Empty |

*Note: A line segment is a limited line with a head and a tail, its direction is from head point to tail point. The solid line is line1 (original line), the dashed line is line2 (cutter line); h1 = head of line1; t1 = tail of line1; h2 = head of line2; t2 = tail of line2.

Fig. 11B

METHOD AND APPARATUS OF SCHEDULING WELDING OPERATIONS FOR A WELDING ROBOT

FIELD OF THE INVENTION

Embodiments of the present disclosure generally relate to a field of welding and more particularly relate to a method and apparatus of scheduling welding operations.

BACKGROUND OF THE INVENTION

Nowadays, robots are wildly used in many fields such as welding, assembling, conveying, paint spraying, laser machining, etc. A welding robot can perform welding operations automatically in a predetermined way in accordance with the robot program. In shipbuilding industry, a small-type steel ship usually has 100 thousands of welds to millions of welds, which means a large amount of workloads. However, currently, the automation level of welding in shipbuilding is still rather low and it will require a great deal of manpower to perform welding operations on the ship. The main barrier of using a robot in this industry lies in that robot programming is not only time consuming but also very complex. Therefore, there is a need in the art to provide a solution of facilitating the use of a robot in such a complex situation.

SUMMARY OF THE INVENTION

To this end, the present disclosure provides a solution for a scheduling welding operations, so as to solve or at least partially mitigate at least a part of problems in the prior art.

According to a first aspect of the present disclosure, there is provided a method of scheduling welding operations. The method comprises identifying seams on a welding object in a three-dimensional model for the welding object based on geometry of bodies contained the welding object. The method also comprises determining a welding sequence based on the seams, welding parameters and welding process requirements. The method further comprises generating an operation procedure for a welding robot based on another three-dimensional model for the welding robot, the welding sequence, robot path parameters and the welding parameters to schedule the welding operations of the welding object.

In an embodiment of the present disclosure, the method may further comprise editing the seams to form a collection of welding seams based on welding process requirements, wherein the welding sequence is determined based on the collection of welding seams.

In another embodiment of the present disclosure, the method may further comprise checking a feasibility of the generated operation procedure for the welding robot in a virtual environment which contains the three-dimensional model for the welding object and the other three-dimensional model for the welding robot.

In a further embodiment of the present disclosure, the method may further comprise adjusting the robot path parameters in response to that the generated operation procedure failing to pass the checking; and wherein another operation procedure is generated for the welding robot based on the adjusted robot path parameter.

In a still further embodiment of the present disclosure, the method may further comprise transmitting the operation procedure to a controller of the welding robot to control the welding operations of the welding robot.

In another embodiment of the present disclosure, the identifying welding seams on parts of a welding object comprises identifying intersection lines between the bodies contained the welding object as the seams, wherein hidden intersection lines are removed from the identified intersection lines.

In a further embodiment of the present disclosure, wherein the welding sequence is further adjusted manually and/or wherein the generated operation procedure is collision free.

In a still further embodiment of the present disclosure, wherein the three-dimensional model for the welding object and the other three-dimensional model for the welding robot are Computer Aided Design (CAD) models.

In a second aspect of the present disclosure, there is further provided an apparatus for scheduling welding operations. The apparatus comprises a seam identification module, a sequence determination module, and a procedure generation module. The seam identification module is configured to identify seams on a welding object in a three-dimensional model (220) for the welding object based on geometry of bodies contained in the welding object. The sequence determination module is configured to determine a welding sequence based on the seams, welding parameters and welding process requirements. The procedure generation module is configured to generate an operation procedure for a welding robot based on another three-dimensional model for the welding robot, the welding sequence, robot path parameters and the welding parameters to schedule the welding operation in welding the welding object.

With embodiments of the present disclosure, the welding procedure could be generated in an automatic way and thus the time and cost required by robot programming could be reduced substantially. Therefore, a robot can be used in welding huge and complex structures or structures manufactured in a small batch and the automatic level can be increased remarkably and the production cost can be reduced accordingly.

BRIEF DESCRIPTION OF THE DRAWINGS

The above and other features of the present disclosure will become more apparent through detailed explanation on the embodiments as illustrated in the description with reference to the accompanying drawings, throughout which like reference numbers represent same or similar components and wherein:

FIGS. 11A-11B illustrate a table of rules or strategies to eliminate hidden lines.

DETAILED DESCRIPTION OF EMBODIMENTS

Hereinafter, solutions as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

As mentioned hereinabove, in, for example, shipbuilding industry, the automation level of welding is still rather low and the reason lies in that robot programming is not only time consuming but also very complex. Therefore, in embodiments of the present disclosure, there is provided a solution for scheduling welding operations, which will be described hereinafter with reference to FIGS. 1 to 8.

Figure 1:
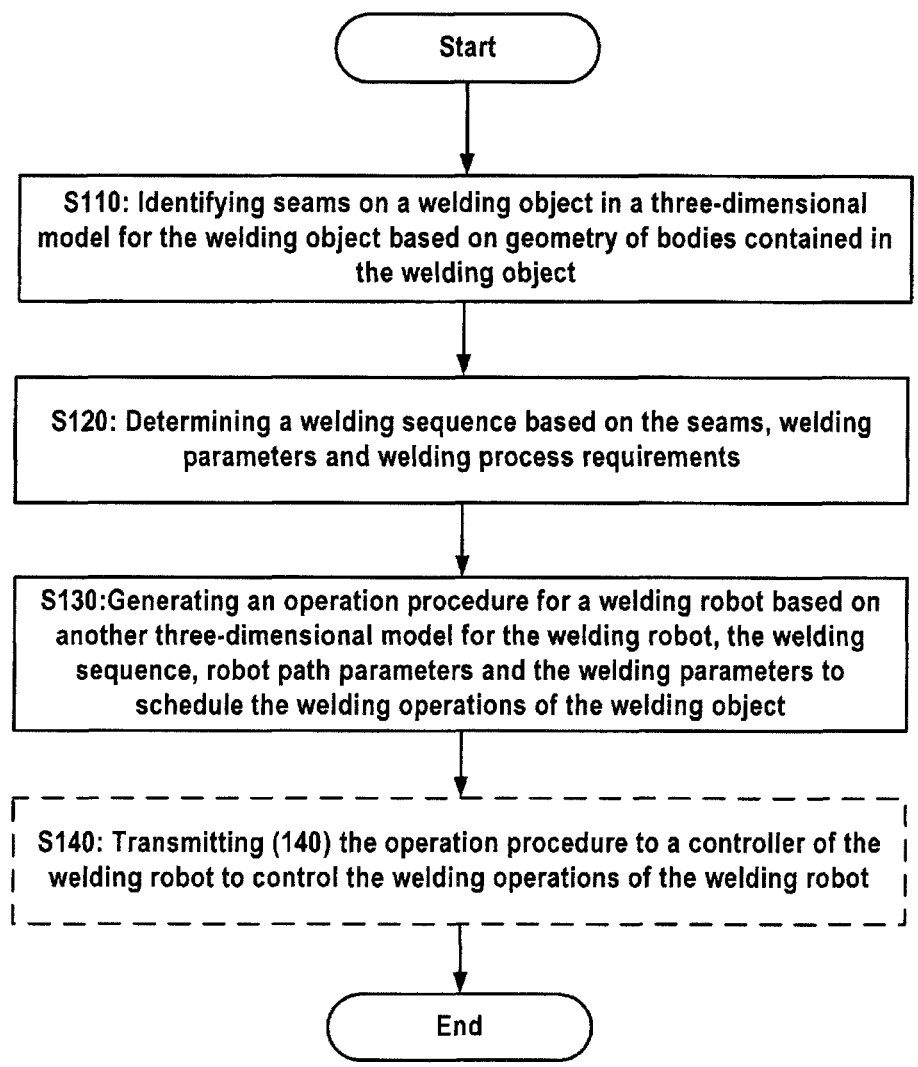
FIG. 1 schematically illustrates a flow diagram of a method of scheduling welding operations according to an embodiment of the present disclosure.

Reference is first made to FIG. 1, which schematically illustrates a flow diagram of a method of scheduling welding operations according to an embodiment of the present disclosure.

As illustrated in FIG. 1, the method starts from step 110, in which seams on a welding object in a three-dimensional model for the welding object is identified based on geometry of bodies contained in the welding object.

Usually, for a welding object such as a ship, a three-dimensional model will be designed before the manufacturing. This three-dimensional model may be for example a Computer Aided Design (CAD) model or any other kind of three-dimensional model. Another three-dimensional model for the robot to be used can also be built. The other three-dimensional model for the robot may also be for example a Computer Aided Design (CAD) model or any other kind of three-dimensional model. The two three-dimensional models can be loaded into a virtual environment in for example a computer. The two models will be laid out exactly in accordance with their respective real setups.

The three-dimensional model for the welding object contains a plurality of geometrical bodies. Each of the geometrical bodies has a shape such as a cuboid, a cylinder, a cone, a sphere, a semi-sphere, or any other shape or the combination thereof. The seams usually exist between two bodies. Thus, seams on parts of the welding object can be identified based on geometry of the parts of the welding object in a three-dimensional model for the welding object. The term "geometry" used herein refers to measurement, relationships of geometrical bodies which indicate shapes, structures, location of the geometrical bodies. Particularly, intersection lines between any two geometrical bodies can be identified and the intersections lines can be taken as the candidate seams. The intersection lines between geometrical bodies can be identified easily through geometry of the bodies. As an example, the intersection line identification can be identified by means of Ray Tracing, or any other common intersection line identification algorithms. Since, these algorithms are known in the art, details about the identification of the intersection lines will not be elaborated herein, for simplification purposes.

In addition, among the intersection lines, there are both visible intersection lines and hidden intersection lines. The hidden seams are those intersection lines covered by other surfaces, which are invisible and inaccessible by the welding gun. Those hidden intersection lines are not welding seams and could be eliminated from the identified intersection. The hidden intersection lines may be identified and eliminated from the identified intersection lines. The hidden intersections lines can also be identified based on geometry of the bodies particularly the overlapping relationship between the identified intersection lines. For example, an intersection line can be identified as a hidden intersection lines if it is found that the intersection line is overlapped with another intersection line. For example, a welding seam can be identified as a hidden seam if it is found that the welding line is overlapped with another welding seam. It is to be understood that if the welding seam is overlapped with another welding seam, at least four faces are involved and in such case, the overlapped part should be those hidden line.

In an embodiment of the present disclosure, the hidden line elimination rules may include a tail section of a welding seam can be removed from the welding seam if the welding seam is overlapping with another welding seam at the tail section of the welding seam. Besides, if the welding seam is overlapping with the other welding seam at a head section of the welding seam, the head section of the welding seam can be removed. Furthermore, a middle part of the welding seam can also be removed if another welding seam is completely overlapping with the middle part of the welding seam. In a case that the welding seam is completely overlapping with a part of another welding seam, a welding seam can be removed completely.

For illustrative purposes, the follower table in FIGS. 11A-11B shows the specific rules or strategies about how to eliminate hidden lines of two straight lines based on their overlapping relationship.

In that table, the first column indicates the serial number of the rules; the second column indicates location relationship category of two lines, i.e., coplanar or not; the third column indicates a location relationship subcategory of two lines which is indicated by a value of parameter s which is the number of points (head and tail) of a body that locate on other bodies (0-4); the fourth column describes different location relationship cases in respective relationship subcategory; the fifth column shows the graphical expressions of different location relationship cases; the six column shows overlapping relationship corresponding to different location relationship cases; the seventh shows actions which shall be taken to line 1; and the eight column shows output if actions are taken.

In an embodiment of the present disclosure, location relationship between line 1 and line 2 may be determined first, then the number of points of line 1 that locate on line 2 is determined, which is ranging from 0 to 4. Further, based on this information, it may further determined the overlapping relationship, such as "separated", "crossed", "ConnectedCoLine", "ConnectedNotColine", "OverlapHead", "OverlapTail", "OverlapMiddle", "OverlapALL", "OverlapALL_Equal". Among these overlapping relationships, separated", "crossed", "ConnectedCoLine", "ConnectedNotColine" indicate that line 1 and line 2 are separated, crossed, connected and coline, and connected but not coline respectively, which all belongs to a type of Not-overlapping. The remaining "OverlapHead", "OverlapTail", "OverlapMiddle", "OverlapALL", "OverlapALL_Equal" indicate line 1 is overlapped with line 2 at the head section, at the tail section, at the middle part, at the whole part but not equal and at the whole part and equal. Regarding different overlapping type, different actions may be taken to line 1. For example, for the "OverlapHead" Type, the head section of line 1 may be removed; for the "Overlaptail" Type, the tail section of line 1 may be removed; for the "OverlapMiddle" Type, the middle part of line 1 may be removed; for the "OverlapALL" Type, the line 1, as a whole, may be removed; and for the "OverlapALL_Equal" Type, the line 1, as a whole, may be removed and at the same time it suggests line 2 should be removed too.

Based on the example elimination rules, it is possible to obtain all hidden segments from the original lines. These segments to be eliminated can be removed, for example, at the end of the above overlapping identification.

For illustrative purpose, hereinafter reference will be made to FIGS. 2 to 4 to describe the welding seam identification of a welding object with a simple structure.

Figure 2:
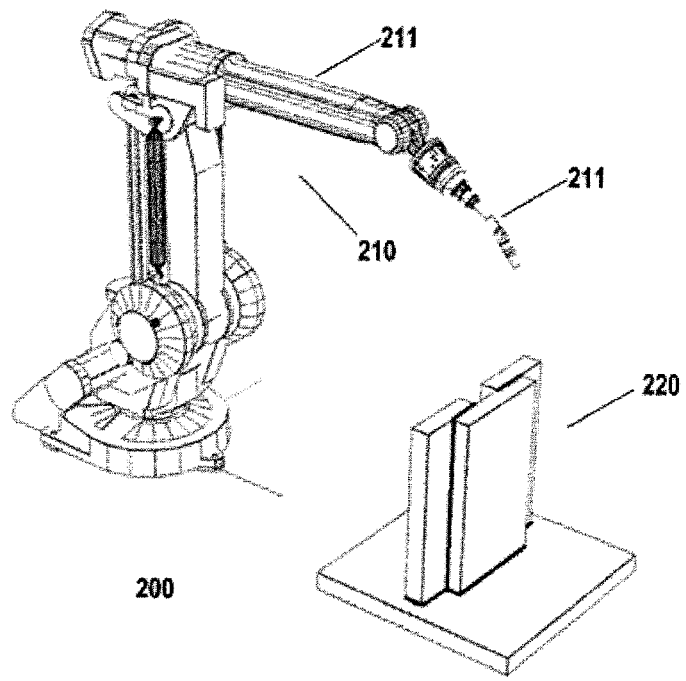
FIG. 2 schematically illustrates example three-dimensional models for a welding object and a welding robot in a virtual environment according to an embodiment of the present disclosure.

FIG. 2 schematically illustrates example three-dimensional models for a welding object and a welding robot in a virtual environment according to an embodiment of the present disclosure. As illustrated in FIG. 2, in the virtual environment 200 are contained a three-dimensional model 210 for a welding robot and another three-dimension model 220 for a weld object. The models 210 and 220 are both CAD models. The two models 210 and 220 are arranged in accordance with their respective real setups in the real environment. The robot as illustrated includes an arm 211 and a welding gun 212 which will be used to weld the welding object.

Figure 3:
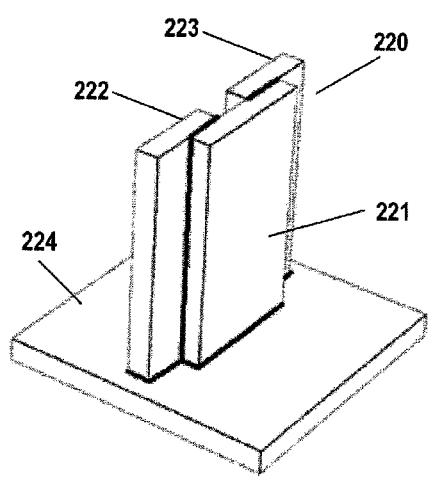
FIG. 3 schematically illustrates a detailed structure of an example welding object in a three-dimensional mode in a virtual environment according to an embodiment of the present disclosure.
Figure 4:
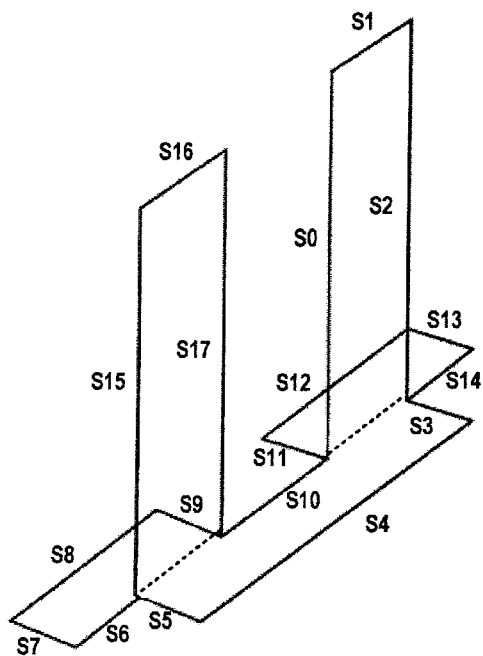
FIG. 4 schematically illustrates identified seams on the example welding object according to an embodiment of the present disclosure.

FIG. 3 schematically illustrates a detailed structure of the welding object in the three-dimensional mode in the virtual environment according to an embodiment of the present disclosure. As illustrated in FIG. 3, the part 220 contains three vertical plates 221, 222 and 223 and one base plate 224 on which are arranged the three vertical plates 221, 222 and 223. Among the three vertical plates, two plates 222, 223 are arranged in the same plane with a gap therebetween and main surfaces thereof are parallel to two opposite side edges of the base plate 224; and the remaining one 221 is arranged immediately before the two vertical plates 222, 223 and covers the gap between them.

For the structure of the part 220 as illustrated in FIG. 3, the intersection lines between geometrical bodies of the parts can be identified based on the geometry of respective bodies contained in the welding object. Particularly, a plate can be expressed as a body containing six surfaces wherein each surface contains four lines with each line composed of a head point and a tail point. Intersection lines between any two of the plates can be identified for example by means of Ray Tracing. In such a way, intersection lines among these plates can be identified. The intersection lines identified on the part are illustrated in FIG. 4, wherein schematically illustrates identified welding seams S1 to S16. As illustrated, all intersection lines among the four plates are identified including those hidden intersection lines.

Figure 5:
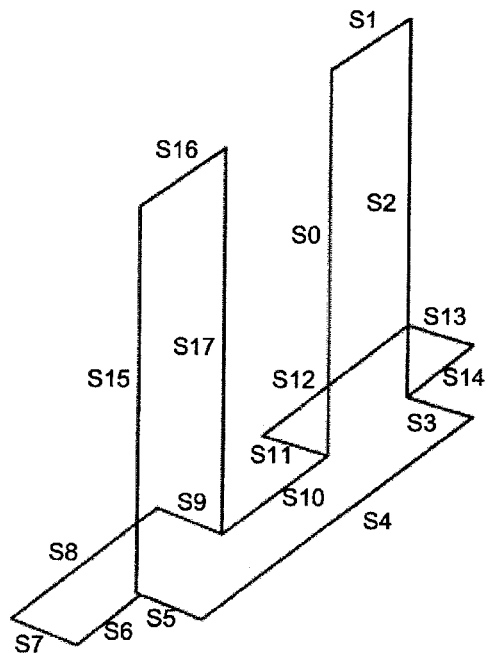
FIG. 5 schematically illustrates identified seams on the example welding object with hidden seams removed according to an embodiment of the present disclosure.

Further, hidden lines may further identified from those identified seams based on the geometry of these plates. For example, the hidden intersection lines can be identified by identifying the overlapping part of two intersection lines. It can be understood that a hidden intersection line is usually an intersection line among at least three surfaces and thus if there is another intersection line completely or partly overlapping with an intersection line, the intersection line will be a hidden line. Thus, the overlapping part is the hidden intersection line. For example, based on the hidden line elimination rules as described above, the identified hidden lines are illustrated as dash lines in FIG. 4. Since the hidden intersection lines are covered by plates and thus inaccessible for the welding gun of the robot, these hidden intersection lines can be removed from the identified seams. Thus, we can obtain the final identified seams with the hidden lines removed, which are illustrated in FIG. 5.

It is to be understood that the example structure is illustrated only for illustrative purposes and in a real application such as a shipbuilding application, the structure of the welding object could be rather complex; however, based on similar principles and operations, the seams of a complex structure can be identified as well.

Figure 6:
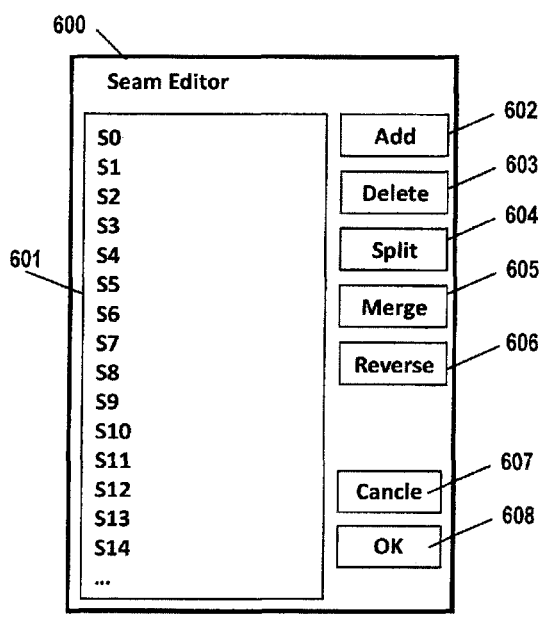
FIG. 6 schematically illustrates a seam editor according to an embodiment of the present disclosure.

After the welding seams are identified from the point of view of geometry, the seams may be further edited based on welding process requirements so as to form a collection of welding seams. For example, a seam may be deleted if the seam is not required to be weld. A new seam can be also added if the seam has not been identified because of assembly gap or a gap resulting mismatch in the CAD model. Two seams may also be merged if they are end to end, or a seam can be split if it is too long for welding. In addition, it is possible to reverse a direction of a welding seam, for example changing it from a direction of top-to-bottom to a direction of bottom-to-top. The editing of the welding seams can be performed automatically based on predetermined editing rules. Or alternatively and additionally, the welding seams can be checked and edited manually by a user which is skilled in the art. FIG. 6 schematically illustrates a seam editor according to an embodiment of the present disclosure. As illustrated, the seam editor 600 comprises a list of the identified welding seams 601. The user could select one or more of them to edit by means of editing buttons 602 to 606, for example, add a new seam, delete an unnecessary seam, split one seam to two seams, merge two seams, or reverse a direction of a seam. The buttons 607 and 608 can be used to cancel or confirm the editing of the seams. In such a way, the welding seams may be edited so that they are suitable for welding and thus a final collection of welding seams can be formed.

Then, at step S120, a welding sequence may be determined based on the welding seams, welding parameters and welding process requirements. The welding sequence is a sequence for welding the welding object, which indicates the orders of seams to be weld. The welding sequence is important during the welding and it might even affect the life time of the welding structure because different heat effect would cause different internal stress. The welding sequence is related to the seams to be weld, the welding parameters, etc. and at the same time, it shall meet welding process requirements.

Figure 7:
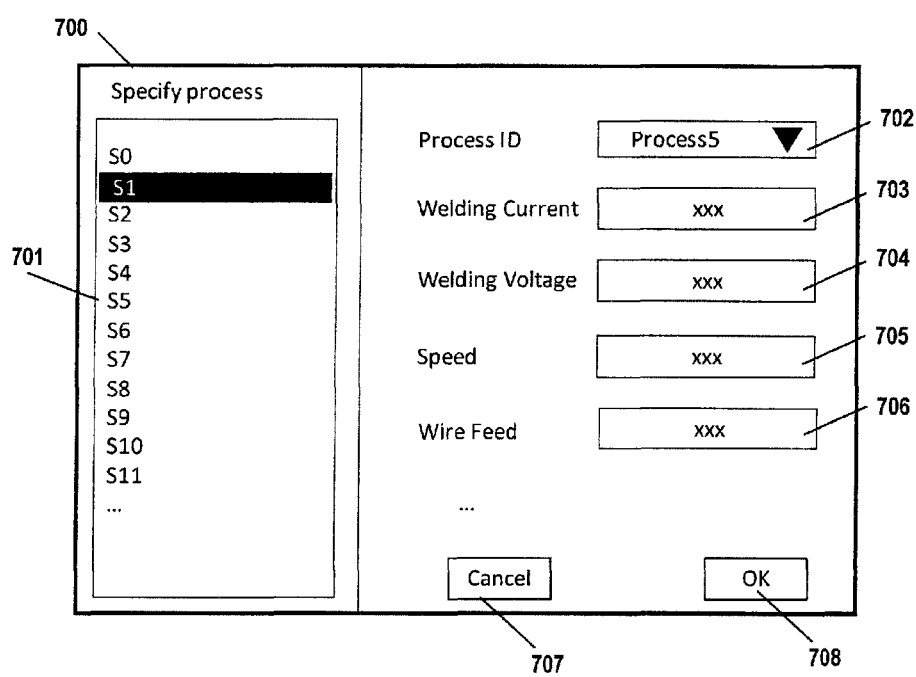
FIG. 7 schematically illustrates a parameter modifier according to an embodiment of the present disclosure.

The welding parameters are parameters used in welding such as welding current, welding voltage, welding speed, wire feeding speed, or the like. The welding parameters can be determined based on the properties of the welding object to be weld, such as material of respective parts to be weld, the thickness of the plate and so on. Setting of welding parameter can be performed automatically based on preset properties of respective parts and parameter setting rules established based on, for example welding process requirements, or experts experience. Preferably, due to the complexity of the welding procedure, the set welding parameters can be further modified by a user manually. FIG. 7 illustrates a parameter modifier which provides an interface to the user to modify the welding parameters for each welding seam. As illustrated in FIG. 7, the parameter modifier 700 includes a list of welding seams 701. The user may select one seam and edit the process for the seam and edit the parameter values, changing such as welding current, welding voltage, welding speed, wire feeding speed by means of interface objects 702 to 706. The buttons 707 and 708 can be used to cancel or confirm the modification of the process parameters.

Figure 8:
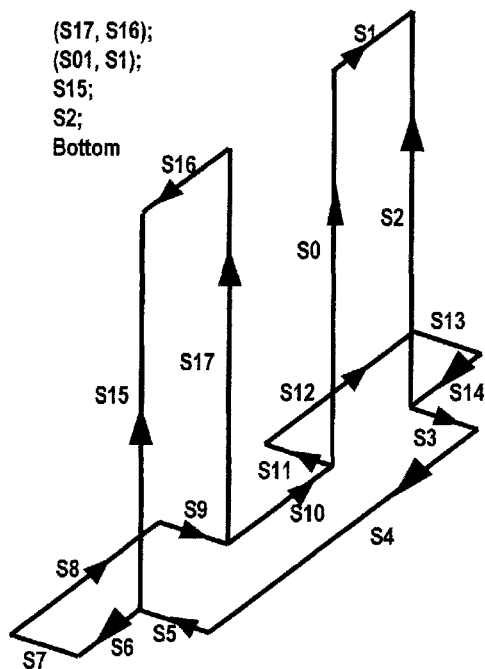
FIG. 8 schematically illustrates the welding sequence on the example part according to an embodiment of the present disclosure.

In addition, there are a lot of welding process requirements in a welding process. For example, the welding sequence should meet symmetrical welding requirements so as to minimize the effect of stress caused by the welding. Thus, in such a case, the welding sequence may be determined based on the welding seams, welding parameters and welding process requirements. FIG. 8 illustrates the welding sequence on the example part according to an embodiment of the present disclosure. As illustrated in FIG. 8, For the example part, the welding will be performed in an order of (S17, S16), (S0, S1), S15, S2, and bottom, wherein (S17, S16) and (S0, S1) indicates merged seam of seams S17 and S16 and merged seam of seams S0 and S1, respectively and "bottom" indicates the merged seam of seams S3 to S14. In addition, the welding direction will follow the arrows as indicated in FIG. 8.

Figure 9:
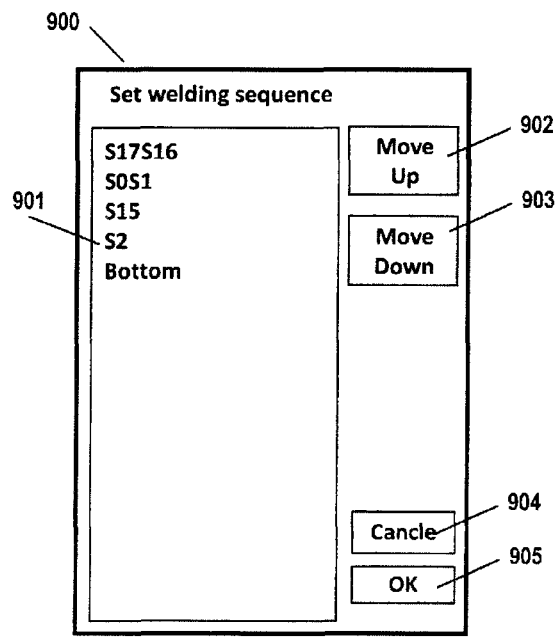
FIG. 9 schematically illustrates a sequence modifier according to an embodiment of the present disclosure.

Furthermore, it is also possible for the user to further modify or adjust the generated welding sequence manually. FIG. 9 illustrates a sequence modifier for modifying the welding sequence. The sequence modifier 900 provides a user interface for the user. As illustrated in FIG. 9, the user may select one welding seam from the generated welding sequence 901 and use the "Move Up" button 902 or "Move Down" 903 button to change the rank of a welding seam. The buttons 904 and 905 can be used to cancel or confirm the modification of the welding sequence. In such a way, it is possible to further guarantee feasibility of the welding sequence.

Afterwards at step S130, an operation procedure for the welding robot is generated based on another three-dimensional model for the welding robot, the welding sequence, robot path parameters and the welding parameters to schedule the welding operations of the welding object. It can be understood, the operation procedure is to be used by the welding robot and thus the structure of the welding robot is relative thereto. The other three-dimensional model 210 for the welding robot can be used to provide such information. The robot path parameters are parameters set for the welding robot, which include, for example, a moving path for the welding robot and the gesture of the welding gun. Based on The other three-dimensional model, the robot path parameter, the determined welding sequence, the welding parameters to be used in the welding, an operation procedure for a welding robot can be generated automatically, for example in accordance with predetermined operation procedure generation rules, which are known in the art and thus will not be described herein. The operation procedure can generated as a collision free procedure, which means the relative location of the robot to the welding object during the welding may be further taken into consideration.

After that, at step S140, the operation procedure may be transmitted to a welding robot so as to schedule the welding operations of the welding robot in welding. However, before the operation procedure is provided to the welding robot, a feasibility of the operation procedure may be further checked. For example, the checking of the operation procedure for the welding robot can be performed in a virtual environment which comprises the well-arranged three-dimensional model for the welding object and the other three-dimensional model for the welding robot. In the virtual environment, the robot will perform the welding operations virtually in accordance with the generated operation procedure in the welding sequence, with the welding parameter and the robot path parameter. If any of the welding process requirements are not met or there might be a collision, the operation procedure does not pass the checking; otherwise, it passes the checking and can be transmitted to a welding robot. In response to a failure of the checking, the robot path parameters used for generating the operation procedure may be adjusted and another operation procedure may be generated based on the adjusted robot path parameters and checked again.

With embodiments of the present disclosure, the welding procedure could be generated in an automatic way and thus the time and cost required by robot programming could be reduced substantially. Therefore, a robot can be used in welding huge and complex structures or structures manufactured in a small batch and the automatic level can be increased remarkably and the production cost can be reduced accordingly.

In addition to the method described hereinabove, there is also presented an apparatus for scheduling welding operations, which will be described with reference to FIG. 10.

Figure 10:
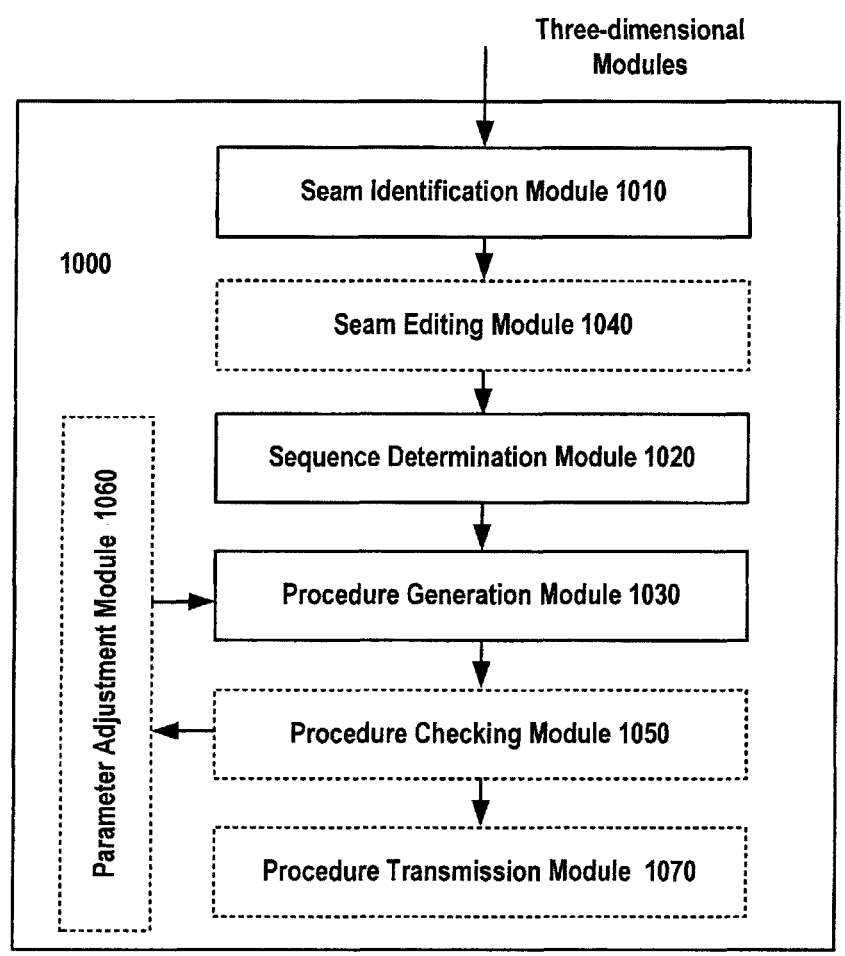
FIG. 10 schematically illustrates a block diagram of an apparatus of scheduling welding operations according to an embodiment of the present disclosure.

As illustrated in FIG. 10, apparatus 1000 may comprise a seam identification module 1010, a sequence determination module 1020 and a procedure generation module 1030. The seam identification module 1010 may be configured to identify seams on a welding object in a three-dimensional model for the welding object based on geometry of bodies of the welding object. The sequence determination module 1020 is configured to determine a welding sequence based on the seams, welding parameters and welding process requirements. The welding sequence may be further adjusted manually in order to ensure that the weld sequence is feasible in practice. The procedure generation module 1030 is configured to generate an operation procedure for a welding robot based on another three-dimensional model for the welding robot, the welding sequence, robot path parameters and the welding parameters to schedule the welding operation in welding the welding object. Particularly, the operation procedure may be a collision free operation procedure.

In an embodiment of the present disclosure, the apparatus 1000 may further comprise a seam editing module 1040, configured to edit the welding seams to form a collection of welding seams based on welding process requirements, wherein the welding sequence is determined based on the collection of welding seams.

In another embodiment of the present disclosure, the apparatus 1000 may also comprise a procedure checking module 1050, configured to check a feasibility of the generated operation procedure for the welding robot in a virtual environment which contains the three-dimensional model for the welding object and the other three-dimensional model for the welding robot.

In a further embodiment of the present disclosure, a parameter adjustment module 1060 may be configured to adjust the robot path parameters in response to that the generated operation procedure failing to pass the checking. In such case, the procedure generation module 1030 may be configured to generate another operation procedure for the welding robot based on the adjusted robot path parameters.

In a still further embodiment of the present disclosure, the apparatus 1000 may also comprise procedure transmission module 1070, configured to transmit the operation procedure to a controller of the welding robot to control the welding operations of the welding robot.

In a yet further embodiment of the present disclosure, the seam identification module 1010 may be further configured to identify intersection lines between the bodies contained the welding object as the seams, wherein hidden intersection lines are removed from the identified intersection line.

In a still yet further embodiment of the present disclosure, the three-dimensional model for the welding object and the other three-dimensional model for the welding robot may be Computer Aided Design (CAD) models.

In the above, the apparatus 1000 as provided in embodiments of the present disclosure has been described in brief with reference to FIG. 10. However, it may be also appreciated that the apparatus 1000 and the modules as contained therein will perform similar operations as described hereinbefore with regarding to the method. Accordingly, for details about these operations, reference may be made to the description about the method with reference to FIGS. 1 to 9.

Besides, specific embodiments of the present disclosure are described with reference to the accompanying drawings; however, they are presented only for illustration purposes and the present disclosure is not limited thereto. As an example, the user interfaces as illustrated in FIGS. 6, 7 and 9 are only example interfaces; in practice, they can be modified, for example, made more complex. The welding object as illustrated in FIGS. 2 and 3 are only for illustration; in a real application, the welding objection may include huge amount of parts. Besides, the welding object is illustrated as a combination of cuboids; however, the present disclosure is not limited thereto, a welding object can contain various combinations of various bodies, such a cylinder, a cone, a sphere, a semi-sphere, or any other shape or the combination thereof and thus the skilled in the art can also identify the seams thereof from the teachings provided herein.

The skilled in the art can also appreciate that the solution as provided herein may take the form of a hardware embodiment, a software embodiment (including firmware, resident software, micro-code, etc.) or an embodiment combining software and hardware aspects. That is to say, one or more of the seam identification, the welding sequence determination, the operation procedure generation, the seam editing, the procedure checking, the parameter adjustment, procedure transmission described herein can be implemented by electronic elements or devices, software stored in storage device, or the combination of electronic devices and the software, for example by micro-processors, digital signal processor, simple chip machine, and suitable programs etc.

Hereinabove, embodiments of the present disclosure have been described in details through embodiments with reference to the accompanying drawings. It should be appreciated that, while this specification contains many specific implementation details, these details should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method of scheduling welding operations, comprising:
    identifying a plurality of candidate seams on a welding object in a three-dimensional model for the welding object based on intersection lines between geometrical bodies contained in the welding object;
    determining weld seams from the candidate seams, wherein hidden intersection lines are removed from the identified intersection lines based on an overlapping relationship among the identified intersection lines, the hidden intersection lines being inaccessible hidden seams covered by surfaces of the welding object;
    determining a welding sequence based on the weld seams, welding parameters and welding process requirements;
    generating an operation procedure for a welding robot based on another three-dimensional model for the welding robot, the welding sequence, robot path parameters and the welding parameters to schedule the welding operations of the welding object.

2. The method of claim 1, further comprising:
    editing the weld seams to form a collection of welding seams based on the welding process requirements, wherein the welding sequence is determined based on the collection of welding seams.

3. The method of claim 1, further comprising:
    checking a feasibility of the generated operation procedure for the welding robot in a virtual environment which contains the three-dimensional model for the welding object and the other three-dimensional model for the welding robot.

4. The method of claim 3, further comprising:
    adjusting the robot path parameters in response to that the generated operation procedure failing to pass the checking; and
    wherein another operation procedure is generated for the welding robot based on the adjusted robot path parameters.

5. The method of claim 1, further comprising:
transmitting the operation procedure to a controller of the welding robot to control the welding operations of the welding robot.

6. The method of claim 1, wherein the welding sequence is further adjusted manually and/or wherein the generated operation procedure is collision free.

7. The method of claim 1, wherein the three-dimensional model for the welding object and the other three-dimensional model for the welding robot are Computer Aided Design (CAD) models.

8. The method of claim 2, further comprising:
checking a feasibility of the generated operation procedure for the welding robot in a virtual environment which contains the three-dimensional model for the welding object and the other three-dimensional model for the welding robot.

9. The method of claim 2, further comprising transmitting the operation procedure to a controller of the welding robot to control the welding operations of the welding robot.

10. An apparatus for scheduling welding operations, comprising:
a seam identification module, configured to identify weld seams on a welding object in a three-dimensional model for the welding object based on geometrical bodies contained in the welding object, wherein the seam identification module identifies a plurality of candidate seams based on intersection lines between the geometrical bodies and determines the weld seams from the candidate seams by removing hidden intersection lines from the identified intersection lines based on an overlapping relationship among the identified intersection lines, the hidden intersection lines being inaccessible hidden seams covered by surfaces of the welding object;
a sequence determination module, configured to determine a welding sequence based on the weld seams, welding parameters and welding process requirements; and
a procedure generation module, configured to generate an operation procedure for a welding robot based on another three-dimensional model for the welding robot, the welding sequence, robot path parameters and the welding parameters to schedule the welding operation in welding the welding object.

11. The apparatus of claim 10, further comprising:
a seam editing module, configured to edit the weld seams to form a collection of welding seams based on the welding process requirements, wherein the welding sequence is determined based on the collection of welding seams.

12. The apparatus of claim 10, further comprising:
a procedure checking module, configured to check a feasibility of the generated operation procedure for the welding robot in a virtual environment which contains the three-dimensional model for the welding object and the other three-dimensional model for the welding robot.

13. The apparatus of claim 12, further comprising:
a parameter adjustment module, configured to adjust the robot path parameters in response to the generated operation procedure failing to pass the checking; and
wherein the procedure generation module is configured to generate another operation procedure for the welding robot based on the adjusted robot path parameters.

14. The apparatus of claim 10, further comprising:
a procedure transmission module, configured to transmit the operation procedure to a controller of the welding robot to control the welding operations of the welding robot.

15. The apparatus of claim 10, wherein the welding sequence is further adjusted manually and/or wherein the generated operation procedure is collision free.

16. The apparatus of claim 10, wherein the three-dimensional model for the welding object and the other three-dimensional model for the welding robot are Computer Aided Design (CAD) models.

* * * * *